Dec. 11, 1962  G. N. BLISS  3,067,605
CRACKED EGG DETECTOR
Filed Aug. 9, 1957  3 Sheets-Sheet 1

INVENTOR.
GEORGE N. BLISS
BY Robert V. Morris,
att'y.

Dec. 11, 1962  G. N. BLISS  3,067,605
CRACKED EGG DETECTOR
Filed Aug. 9, 1957  3 Sheets-Sheet 2

INVENTOR.
GEORGE N. BLISS
BY

INVENTOR.
GEORGE N. BLISS
BY Colman, Noid & Kraus

ATTORNEYS

United States Patent Office 3,067,605
Patented Dec. 11, 1962

3,067,605
CRACKED EGG DETECTOR
George N. Bliss, Ithaca, N.Y.
(1871 Villa Road, Birmingham, Mich.)
Filed Aug. 9, 1957, Ser. No. 677,242
9 Claims. (Cl. 73—12)

This invention relates to the inspection and packing of eggs, and particularly to an automatic mechanism for detecting and rejecting cracked eggs as they pass along the inspection line of an egg packing plant. Before eggs can be marketed they must be inspected and candled for quality. While cracked eggs can be readily identified by ordinary candling methods, they constitute by far the largest percentage of eggs which must be eliminated in any candling operation; and automatic elimination of cracked eggs would greatly ease the burden on the candler, who could then devote his whole time to the detection of bloods and other internal defects.

The problem of automatic crack detection is a delicate one due to the fragile character of the egg; and the need for refraining from aggravating any crack that already exists is essential to the successful operation of a conveyor line. If an egg breaks open and pours its contents on moving mechanical parts, the conveyor must be immediately stopped and thoroughly cleansed of the sticky egg fluid in order to prevent the machine from acquiring an unsanitary and odoriferous condition. To stop the conveyor line means in effect to stop the work of the candlers and packers dependent upon it. Hence any successful crack detector must operate in such a manner as not to aggravate a cracked condition, and of course not injure good eggs at all.

In this respect the present invention differs fundamentally from the destructive tests such as sometimes applied to electric light bulbs and other brittle objects, where the purpose is to test their strength by seeing how many blows they will withstand before they break. It also differs from testing the hardness of homogeneous metals by dropping steel balls thereon, in that with eggs the problem is of great delicacy, the egg not being homogeneous. The object here is not to measure hardness, but rather to detect small cracks that later might cause trouble. I have discovered that fortunately there is a marked difference between the elastic characteristics of a perfect shell and those of even a slightly cracked one.

In the present invention one or more very light hammers are used; and since their contact with the egg is instantaneous, the mechanism is ideally suited to high speed conveyor lines. There is no need to stop the egg or run the line intermittently. The device is readily adaptable to a line of eggs moving or rolling continuously.

Referring now to the drawings forming part of this specification,

Figure 1:
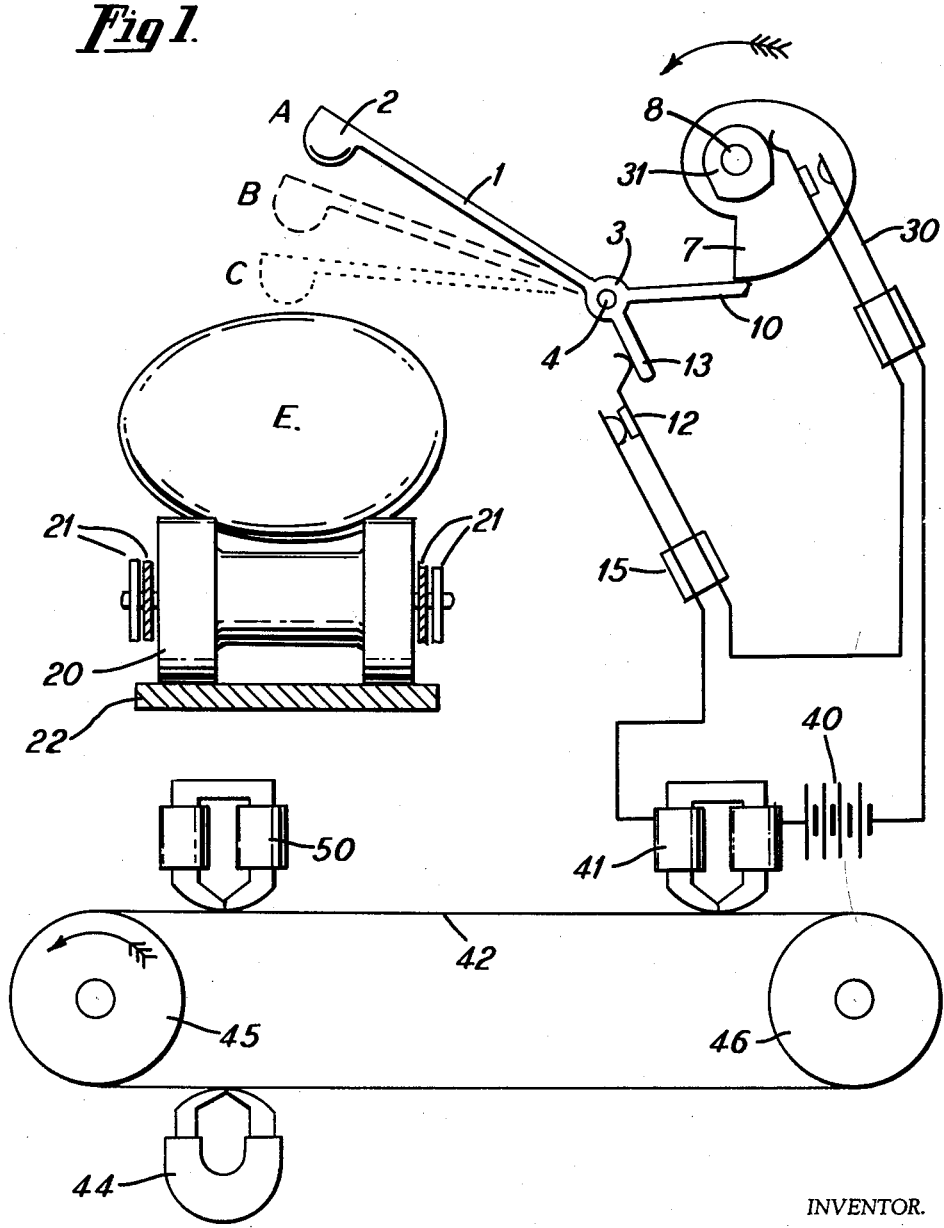
FIG. 1 shows a mechanism for instantaneously detecting cracked eggs as they move along a conveyor line, together with a memory mechanism by which the cracked eggs can be removed from the conveyor at any point further along the line as may be desired.

As shown in FIG. 1 of the drawing, the egg E is carried along a conveyor line by rollers 20 connected by links of conveyor chain 21, these rollers travelling on a stationary strip 22 so that their rotation will tend to revolve the egg E for purposes to be described. The crack testing mechanism is of the rebound type; but since we are not measuring hardness of homogeneous materials it is of different composition and character; and the impact element may also be given an initial acceleration for more rapid action.

In the form illustrated, the drop hammer 1 has a light impact head 2 of hard but light weight material, preferably plastic, its weight and inertia being such that even eggs that are badly cracked will not be further damaged by its impact. It is essential that the blow be non-destructive. The hammer 1 with head 2 has a hub 3 pivoted on the center pin 4 for limited motion as shown.

The hammer 1 is operated by a cam 7 mounted on the rotary shaft 8. As the cam shaft 8 turns in a counter-clockwise direction as indicated by the arrows it depresses the tail of the follower arm 10 attached to the hub 3 and gradually elevates the hammer head 1 to the position A. The tail of the follower 10 then rides off the high point of the cam 7 which allows the hammer head 2 to drop and strike the egg E. This drop may be somewhat accelerated by a light spring 12 pressing on a short arm 13 also attached to the hub 3 of the hammer 1. In the preferred embodiment this spring 12 is attached to or part of an electric contact 15 to be described, though other light accelerator means may be used if desired.

When the hammer head 1 drops from the position A on to the shell of the egg E, and that egg has no cracks, the elastic characteristics of the egg are such that the hammer 1 will rebound a substantial amount as to the position B, indicated by dashed outline. But if the shell is cracked anywhere in the vicinity of where the hammer strikes there will be little or no rebound—the hammer only returning to some such position as shown at C, indicated by dotted outline. Though the egg is a complex structure and may retain its definite form, its elasticity when tested by such a light blow is distinctly less if it has any slight cracks. Yet this test is non-destructive and does not appreciably aggravate a cracked egg condition or cause conveyor line stoppages.

A rebound from a sound egg to the position B is sufficient to move the arm 13 so as to close the electric contacts 15 which can energize any suitable mechanism for passing the egg on to the approved packing boxes for shipment. When the cam 7 is rotating and elevating the hammer 1 for a drop, the short arm 13 pressing on the spring 12 would prematurely close the electrical contacts 15 and so cause a false reading which had nothing to do with a rebound from the egg shell. To prevent such an electrical impulse from activating the selection mechanism erroneously, there is provided the supplemental contacts 30 in series with the contacts 15, these supplemental contacts 30 being operated by a supplemental cam 31 mounted on the shaft 8 so as to turn with the elevating cam 7 but in a different phase, which insures that the contacts 15 will be inactivated except during a proper rebound. To do this the conformation of the cam 31 is such that it holds the contacts 30 open and interrupts the circuit except at the particular time when the hammer 1 is making its test, so that closing the contacts 15 at other times does no harm since the circuit is broken. It might seem from the foregoing that the time of opening and closing of the contacts 30 would be extremely critical. However, in actual practice, operating at a rate of three eggs per second, it has been found that cam 31 may lag cam 7 by as much as 30° or 40°.

While it is possible to remove a cracked egg from the line immediately after an indication of "cracked" is obtained, it is usually preferable to drop the egg into a carton or flat at a point further along the conveyor line.

This delayed removal may be accomplished with any of several types of "memory" device. Magnetic tape memories are widely used today in the field of automation, and is used in this disclosure for purposes of illustration.

As shown in FIG. 1, the electric circuit energized by any suitable source of potential 40 passes thru the contacts 15 and jack 30 in series, then to a magnetic tape recording head 41 and back to the power supply 40. The recording head 41 when energized can register a definite magnetic impulse in the moving magnetic tape 42, which impressed local magnetism persists until erased by that portion of the tape passing under the erasing head 44. The tape 42 is an endless loop running over the drums or pulleys 45 and 46.

While the closing of the contacts 15 may be only momentary it is sufficient to record a sharp pulse or "pip" on the magnetic tape 42. The speed of the tape is such that when the egg E reaches the cartoning station for good eggs, the pip on the tape 42 reaches the read-out head 50. The output of the head 50 may be amplified and caused to operate a carton loading mechanism. These techniques are widely used today in the field of automation, and further discussion is unnecessary to this disclosure, which is concerned with a primary initiating device capable of distinguishing cracked from sound eggs.

In the event that the hammer head 1 strikes a cracked egg the rebound is slight as indicated in the position C, dotted outline. This is not sufficient to close the contacts 15, and hence no pip is recorded by the memory mechanism. The cracked egg is accordingly not removed by the read-out head and its associated carton loading mechanism, but continues to travel further along the line to the packing mechanism for cracked eggs.

Figure 2:
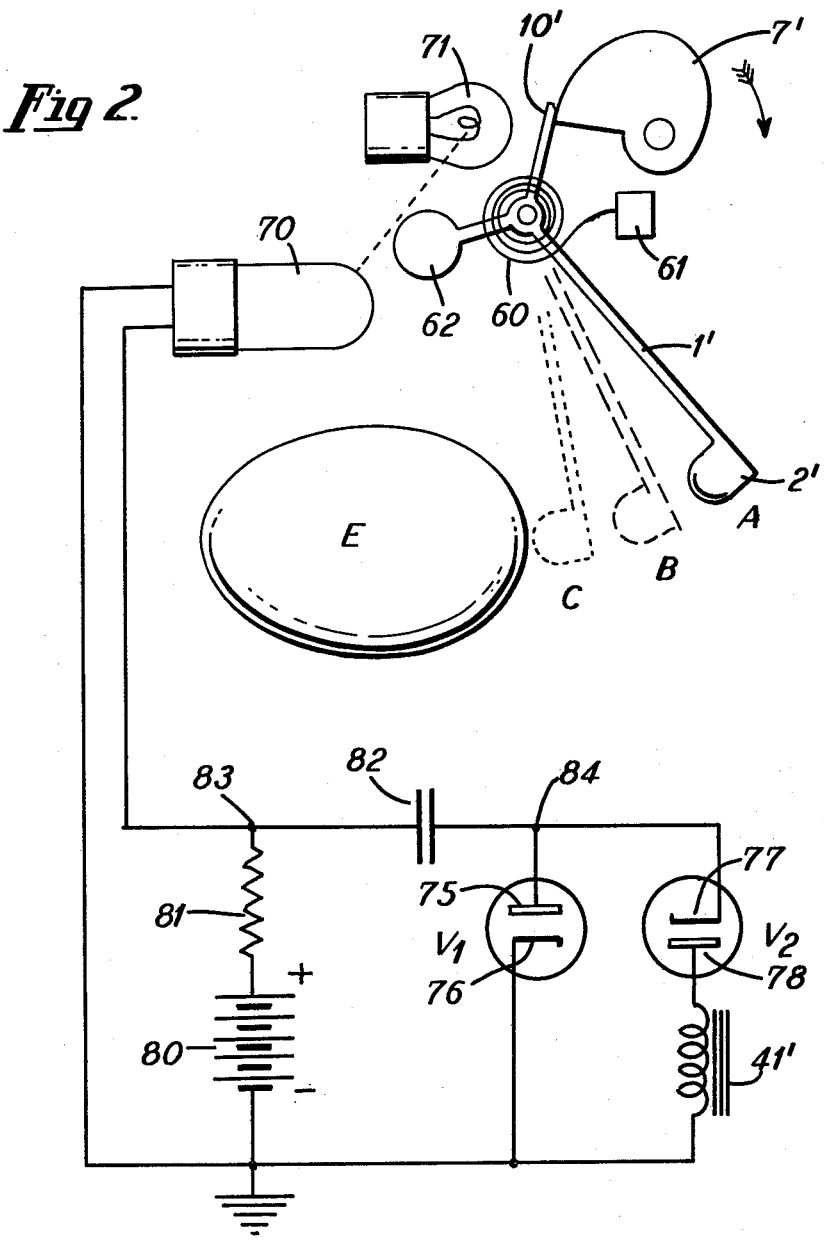
FIG. 2 illustrates another embodiment of the hammer mechanism unaffected by gravity and capable of striking the side or bottom of the egg; and also a photoelectric sensing device which takes the place of the mechanical switches and contacts of modification shown in FIG. 1.

In some installations it may be desirable to make the hammer action substantially independent of gravity so that the eggs may be struck on the side or bottom. It also may be desirable to use a sensing circuit having a photoelectric sensing device so as to obviate the use of mechanical switches and contacts. For example, as shown in FIG. 2, the hammer 1' having a head 2' is placed in a position where gravity has little effect on it, but is acted upon by a light hairspring 60 fastened to a stationary block 61. This spring 60 normally causes the hammer head 2' to press lightly against the egg E, were it not for the action of the cam 7'.

A shutter vane 62 is attached to the hammer 2' so that it can at certain positions intercept a beam of light falling on the phototube 70 from the light source 71. When the hammer 1' is withdrawn to position A—shown in solid lines—the shutter vane 62 does not intercept the light from source 71 to the phototube receiver 70; and the light falling on the phototube 70 causes it to conduct. Phototube current is supplied by voltage source 80 thru resistor 81. The phototube 70 acts essentially as a short circuit when light falls upon it, thereby causing a voltage drop across resistor 81 so that there will be little or no voltage at the point 83.

When the cam follower 10' drops off the tip of the rotating cam 7' (which corresponds to the cam 7 of FIG. 1 except that it happens in FIG. 2 to be illustrated rotating in the opposite direction), the hammer 2' is allowed to strike egg E and the shutter vane 62 intercepts the light beam falling on the phototube 70. The phototube 70 then becomes non-conducting, thus removing the short circuit and allowing the voltage at point 83 to rise. When no light strikes the phototube 70 it passes very little current and hence there is little voltage drop in the resistor 81, so that the voltage at point 83 will tend to become almost equal to the voltage of the power source 80. On the other hand, when more and more light is allowed to fall on the phototube 70, it passes more and more current, which increases the voltage drop across resistor 81, causing voltage at point 83 to drop.

Condenser 82 blocks the flow of direct current but allows sudden changes of voltage at point 83 to be reflected at point 84. The twin diodes $V_1$ and $V_2$ shown here as tubes—but which could be semi-conductors or similar devices—are hooked in opposite polarity. Since a diode has the property that it conducts when its plate is positive with respect to its cathode, point 84 is maintained at ground potential; that is, diode $V_1$ acts as a short circuit preventing the voltage from rising, and diode $V_2$ acts as a short circuit preventing voltage from falling. A sudden increase in voltage at point 83 would normally be transmitted by condenser 82; but diode $V_1$ immediately begins passing current, thus preventing any rise in voltage at point 84. A sudden decrease in the voltage at 83 would cause current to flow in diode $V_2$ and the coil 41' which is in series with it. This coil 41' may be a recording head similar to the recording head 41 of FIG. 1 or a suitable relay coil.

When cam 7' releases hammer 1' so that its head 2' swings toward the egg E, the vane 62 cuts the light beam between 71 and 70, causing a sharp rise in voltage at the point 83; and diode $V_1$ conducts, thus charging condenser 82. In the event that the egg E being tested is sound, without cracks, the hammer 1' will rebound to substantially the position B shown by dashed outline, thereby allowing more light to fall on phototube 70. Whereupon voltage at point 83 will fall sharply causing condenser 82 to discharge thru diode $V_2$ and coil 41', and energizing the rest of the mechanism thru a recording head 41 or other device as described in connection with FIG. 1.

In the event the hammer strikes a cracked egg there is little or no rebound, the hammer only returning to point C as shown by dotted lines. Therefore the circuit does not go thru the second phase of its operation, no current flows thru the coil 41', and a reject is recorded.

The foregoing general type of circuit is well known in the electronic art and is usually called a staircase circuit. Such circuits are subject to many variations, and is shown here merely to illustrate one method of eliminating mechanical contacts and switches which might require more servicing under constant use. Other types of electronic circuits and timers having the property of passing more or less energy according to the rebound may be used.

For the detection of small cracks it may be desirable to tap each egg at several different points. This can be accomplished by placing several hammers and circuits along the line, duplicating the test mechanism as much as desired. It is for that reason that the eggs are made to rotate on rollers 20 as first described, the rollers turning the eggs as they move along and the rollers themselves being made to turn by being pulled over the fixed conveyor strip 22 by the conveyor chain 21. In this manner, by suitably placing successive sets of the impact testing mechanisms, each egg as it revolves can be tapped on as many different points as desired—the egg presenting a different position as it passes under each successive hammer.

Figure 3:
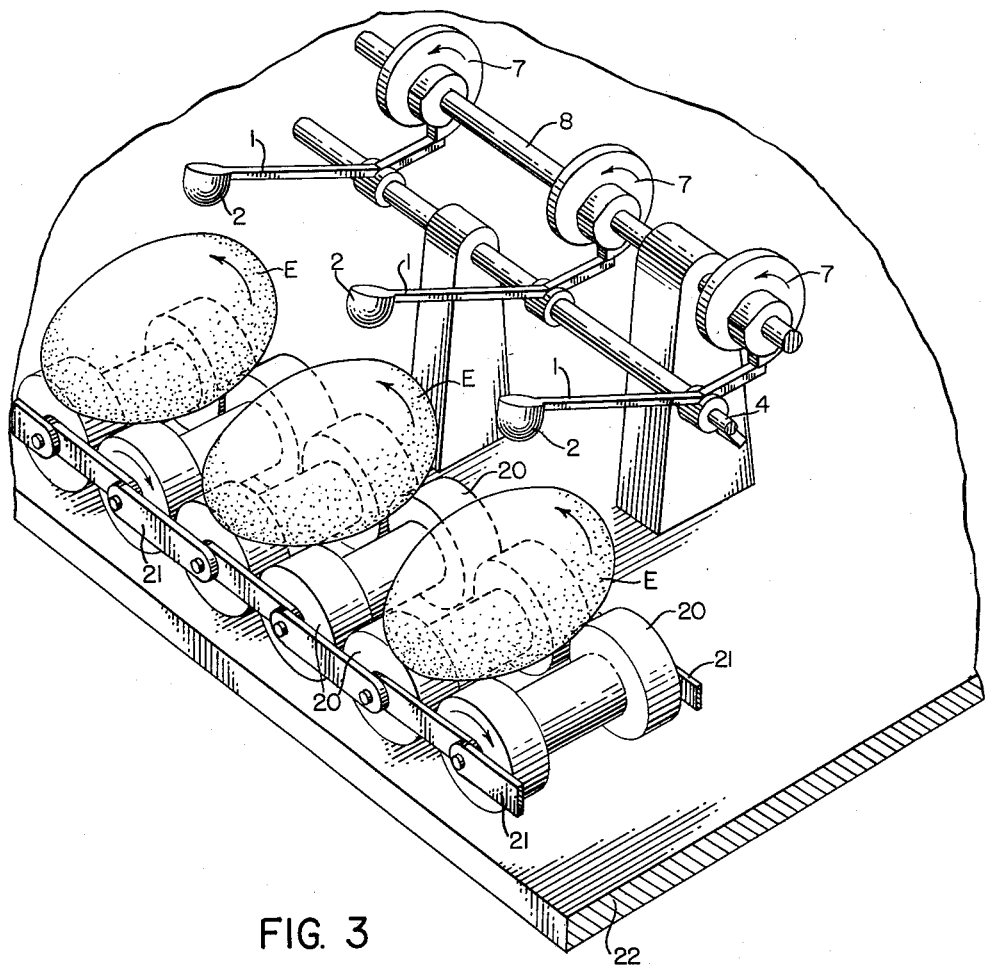
FIG. 3 is a perspective view illustrating an embodiment of a series of impact elements arranged to strike eggs carried by a conveyor under the impact elements, either of the sensing means described herein being utilizable with the impact elements.

As shown in FIG. 3, a series of rollers 20 driven by conveyor chains 21 travel over the stationary strip 22, bearing and rotating eggs E under the impact elements 2 which are rotatably and movably supported on the continuous center pin 4. As cams 7 rotate on their common shaft 8, the impact heads 2 are released to strike the eggs E passing therebelow. Either of the sensing systems or means above described for use with the impact element can be employed for discriminating and identifying the cracked and the uncracked eggs.

While I have in the foregoing described certain specific forms by way of example, it will be understood that they are merely for purposes of illustration to make clear the principles of the invention which is not limited to the particular forms shown. For example, the rebound might be sensed by a photocell, or a proximity device such as a capacity relay. The function performed by the jack 30 could be accomplished electronically by the use of time delay circuits, stair case circuits, or flip-flop circuits, all well known in the art. The hammer need not be pivoted, but could be in the form of a ball dropped down a tube and elevated pneumatically. The invention is susceptible to various modifications and adaptations in different installations as will be apparent to those skilled in the art without departing from the scope of the invention as stated in the following claims.

I claim:

1. In a crack detector mechanism for eggs, the combination of a movable impact element of hard material, means movably supporting said impact element during its course of movement toward the egg to be tested, in striking said egg and in its rebound from said egg, said element being sufficiently light with respect to the shell of said egg so as to avoid breaking said shell even though said shell is cracked, means supporting and moving said egg into a position to receive the strike of said impact element, said element rebounding but slightly when an egg is cracked but rebounding substantially from an uncracked egg, and means for sensing a substantial rebound of said impact element.

2. In a crack detector mechanism for eggs, the combination of a movable impact element of hard material, means movably supporting said impact element in position to strike the egg to be tested, said element being sufficiently light with respect to the shell of said egg so that it will not break the shell of an uncracked egg nor break open the shell of a cracked egg when struck thereby, means supporting and moving said egg toward, into and away from the position of strike by said impact element, said element rebounding but slightly from a cracked egg but rebounding substantially from an uncracked egg, and means for sensing a substantial rebound of said impact element.

3. In a crack detector mechanism for eggs, the combination of a movable impact element of hard material, means supporting said impact element and determining the path of movement of said element such that it will strike the egg to be tested, said element being sufficiently light with respect to the shell of said egg so that it will not break the shell of an uncracked egg nor break open the shell of a cracked egg when struck thereby, means supporting and moving said egg toward, into and away from the position of strike by said impact element, said element rebounding but slightly from a cracked egg but rebounding substantially from an uncracked egg, means for sensing a substantial rebound of said impact element, and supplemental accelerating means for speeding up the motion of said impact element toward the egg to be tested.

4. In a crack detector mechanism for eggs, the combination of a movable impact element of hard material, means supporting said impact element and determining the path of movement of said element such that it will strike the egg to be tested, said element being sufficiently light with respect to the shell of said egg so that it will not break the shell of an uncracked egg nor break open the shell of a cracked egg when struck thereby, means supporting and moving said egg toward, into and away from the position of strike by said impact element, said element rebounding but slightly from a cracked egg but rebounding substantially from an uncracked egg, means for sensing a substantial rebound of said impact element, and means for rotating the egg to present different surface portions of its shell to the impact element for testing.

5. In a crack detector mechanism for eggs, the combination of a movable impact element of hard material, means supporting said impact element and determining the path of movement of said element such that it will strike the egg to be tested, said element being sufficiently light with respect to the shell of said egg so that it will not break the shell of an uncracked egg nor break open the shell of a cracked egg when stuck thereby, means supporting and moving said egg toward, into and away from the position of strike by said impact element, said element rebounding but slightly from a cracked egg but rebounding substantially from an uncracked egg, means for sensing a substantial rebound of said impact element, conveyor means for advancing eggs in succession past the position of said impact element testing for cracks, and means for rotating the eggs as they are conveyed past said impact element to present different surface portions of their shells to the impact element for testing.

6. In a crack detector mechanism for eggs, the combination of a movable impact element of hard material, means for determining the path of movement of said element such that it will strike the egg to be tested, said element being sufficiently light with respect to the shell of said egg so that it will not break the shell of an uncracked egg nor break open the shell of a cracked egg when struck thereby, said element rebounding but slightly from a cracked egg but rebounding substantially from an uncracked egg, means for sensing a substantial rebound of said impact element, said sensing means including an electric contact, spring means normally holding said contact open, a member on said impact element for closing said contact against the action of said spring means in response to a substantial rebound of said impact element to operate said sensing means, said spring means acting through said member to accelerate said impact element during its movement toward the egg to be tested.

7. In a crack detector mechanism for eggs, the combination of an impact element of hard material, means movably supporting said element in position to strike the egg to be tested, means for moving said element in a direction toward the egg to strike the latter, said element being sufficiently light with respect to the shell of said egg so that it will not break the shell of an uncracked egg nor break open the shell of a cracked egg when struck thereby, means supporting and moving said egg toward, into and away from the position of strike by said impact element, said element rebounding but slightly from a cracked egg but rebounding substantially from an uncracked egg, and means for sensing a substantial rebound of said impact element.

8. In a crack detector mechanism for eggs, the combination of an impact element having a head of hard material, means supporting said impact element in position adjacent to the egg to be tested for movement such that the head of said impact element will follow a generally horizontal path in a direction toward the egg to strike the latter, means for thus moving said impact element, said element being sufficiently light with respect to the shell of said egg so that it will not break the shell of an uncracked egg nor break open the shell of a cracked egg when struck thereby, means supporting and moving said egg toward, into and away from the position of strike by said impact element, said element rebounding but slightly from a cracked egg but rebounding substantially from an uncracked egg, and means for sensing a substantial rebound of said impact element.

9. In a crack detector mechanism for eggs, the combination of conveyor means for carrying eggs to be tested for cracks, a series of crack detector impact mechanisms arranged along the path of said conveyor, each of said impact mechanisms having an impact element of hard material adapted to strike the eggs to be tested and being sufficiently light with respect to the shells of said eggs so that it will not break the shell of an uncracked egg nor break open the shell of a cracked egg when struck thereby, said impact elements rebounding but slightly from a cracked egg but rebounding substantially from an uncracked egg, said conveyor means supporting and moving each of said eggs toward, into and away from the position of strike by said impact element, rotating means for turning the eggs as they are conveyed so as to present different portions of the shells of the eggs to be tested by the various impact mechanisms, and means for sensing a substantial rebound of said impact elements.

References Cited in the file of this patent

UNITED STATES PATENTS

| | | |
|---|---|---|
| 1,687,510 | Pipkin | Oct. 16, 1928 |
| 2,207,502 | Zamboni | July 9, 1940 |
| 2,281,324 | Preston | Apr. 28, 1942 |
| 2,635,746 | Gordon | Apr. 21, 1953 |

FOREIGN PATENTS

| | | |
|---|---|---|
| 740,573 | Germany | Oct. 23, 1943 |